United States Patent
Choi et al.

(10) Patent No.: US 6,654,520 B2
(45) Date of Patent: Nov. 25, 2003

(54) PERIODICALLY POLED OPTICAL FIBER AND METHOD FOR THE MANUFACTURE THEREOF

(75) Inventors: Yong-Gyu Choi, Taejon (KR); Jong-Bae Kim, Taejon (KR); Doo-Hee Cho, Taejon (KR); Kyong-Hon Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 108 days.

(21) Appl. No.: 09/961,259

(22) Filed: Sep. 25, 2001

(65) Prior Publication Data

US 2002/0076155 A1 Jun. 20, 2002

(30) Foreign Application Priority Data

Nov. 6, 2000 (KR) ......................................... 2000-65644

(51) Int. Cl.$^7$ ................................................. G02B 6/34
(52) U.S. Cl. ............................... 385/37; 385/10; 385/2; 385/123
(58) Field of Search ........................... 385/10, 37, 144, 385/2, 123; 174/250

(56) References Cited

U.S. PATENT DOCUMENTS

| | | | |
|---|---|---|---|
| 5,037,181 A | * 8/1991 | Byer et al. ................... | 385/144 |
| 5,444,186 A | * 8/1995 | Eguchi ........................ | 174/250 |
| 5,617,499 A |   4/1997 | Brueck et al. | |
| 5,768,462 A |   6/1998 | Monte | |
| 5,966,233 A | 10/1999 | Fujiwara et al. | |
| 6,221,565 B1 | * 4/2001 | Jain et al. ................... | 430/321 |
| 6,259,830 B1 | * 7/2001 | Bhagavatula .................. | 385/2 |

FOREIGN PATENT DOCUMENTS

JP 06-273816 9/1994 ............. G02F/1/37

OTHER PUBLICATIONS

M. H. Chou et al., Efficient Wide–Band and Tunable Mid-span Spectral Inverter Using Cascaded Nonlinearities in LiNbO3 Waveguides, Jan. 2000, pp. 82–84.

V. Pruneri et al., Frequency Doubling of Picosecond Pulses in Periodically Poled D–shape Silica Fibre, Feb. 13, 1997, pp. 318–319.

V. Pruneri et al., Greater than 20%–efficient frequency doubling of 1532–nm nanosecond pulses in quasi–phase–matched germanosilicate optical fibers, Feb. 15, 1999, pp. 208–210.

* cited by examiner

Primary Examiner—Hemang Sanghavi
Assistant Examiner—Eric Wong
(74) Attorney, Agent, or Firm—Jacobson Holman PLLC

(57) ABSTRACT

The present invention relates to the fabrication of an optical device; and, more particularly to an electrode for fabricating periodically poled optical fibers and a fabrication method of periodically poled optical fibers using the electrode. To fabricate periodically poled optical fibers for improving the effect of three wave mixing in accordance with the second-order nonlinear optical phenomenon, the periodically poled optical fibers of the present invention is formed by using one or more electrodes with holes or grooves for a period satisfying the quasi phase matching condition between light waves in use. Also, using the electrodes described above, one or more holes or one or more grooves are formed on the surface of the optical fiber around the core in its length direction, and thereby make an optical fiber poled periodically.

12 Claims, 7 Drawing Sheets

FIG. 8

PERIODICALLY POLED OPTICAL FIBER AND METHOD FOR THE MANUFACTURE THEREOF

FIELD OF THE INVENTION

The present invention relates to an optical device; and, more particularly, to a periodically poled optical fiber and a method for the manufacture thereof.

DESCRIPTION OF THE PRIOR ART

Optical fibers go through the poling process for obtaining second-order nonlinear optical properties. In the general process of poling, a metal electrode(s) is formed at one or both faces of a D-shaped optical fiber, given voltage at a high temperature for a predetermined period, and then cooled down slowly with the voltage still maintained.

Although optical fibers have a big second-order nonlinear coefficient, the phase matching condition between interacting waves should be satisfied. As optical fibers also have the effect of dispersion, which makes the refractive index different according to each wavelength, the phase matching condition usually fails to be achieved between lights with different frequencies. The phase matching can be achieved, though, by adding an absorber, which absorbs light at a certain wavelength and thereby making the refractive index get reversed with respect to the wavelength at around the resonance absorption wavelength, or by using the birefringence of optical fibers. In this way, however, it's hard to fulfill the condition, and the wave range fulfilling the phase matching is extremely limited. Therefore, in order to use the second-order nonlinearity at a required wavelength the phase matching condition needs to be actively controlled, which eventually leads to the introduction of the quasi phase matching condition.

Generally, in second-order nonlinear single crystal, the poling direction is turned at an angle of 180 degree with respect to adjacent domain periodically. So, optical fibers also need to be poled periodically, preferably in opposite poling direction to the adjacent domains.

Figure 1A:
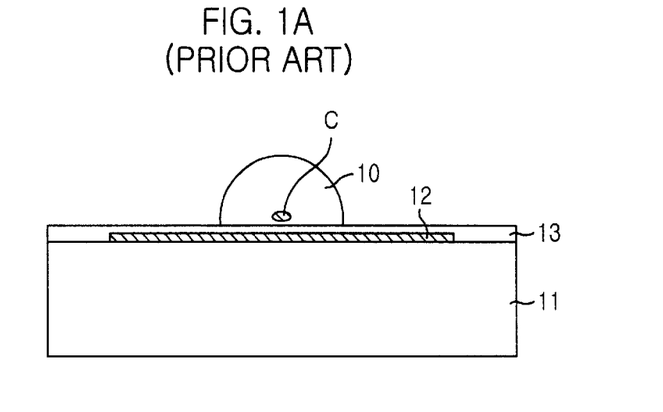
FIGS. 1A to 1C illustrates cross-sectional views of the conventional process of fabricating a periodically poled optical fiber.
Figure 1B:
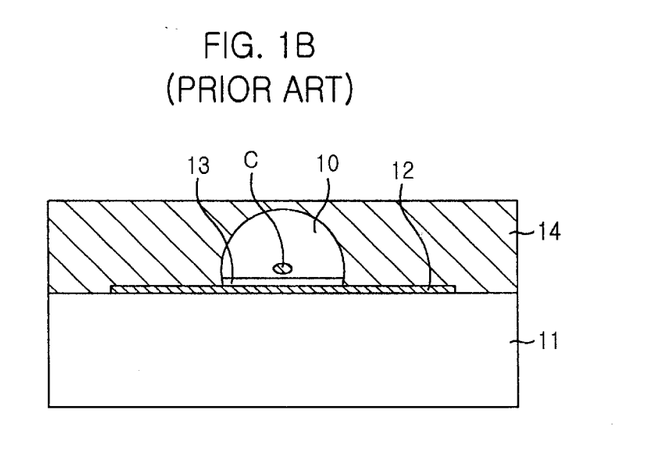
Figure 1C:
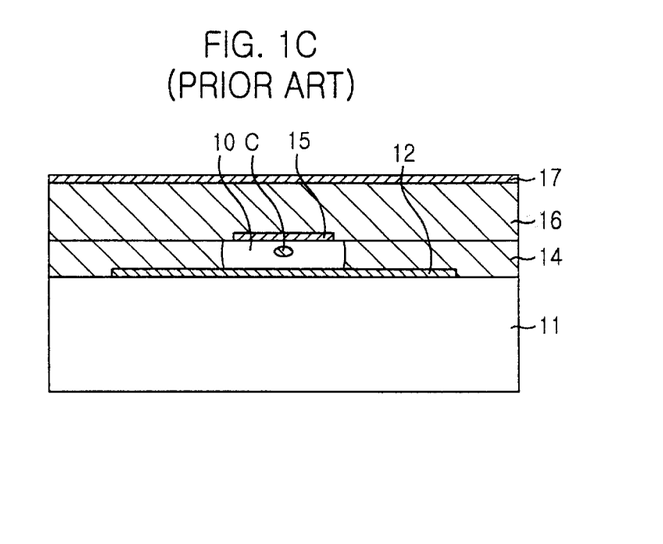

In FIGS. 1A to 1C, there are shown cross-sectional views setting forth a conventional method for fabricating poled optical fibers, described in U.S. Pat. No. 5,617,499, entitled to "TECHNIQUE FOR FABRICATION OF A POLED ELECTROOPTIC FIBER SEGMENT," which is incorporated herein by reference.

As shown in FIG. 1A, a first electrode 12 is formed on top of a silicon substrate 11, then an adhesive layer 13, made of polyimide, is formed on top of the first electrode 12 and the silicon substrate 11 for adhering a D-shaped optical fiber 10 to the first electrode 11. And then, as shown in FIG. 1B, a first insulation layer 14, made of polyimide, is formed on top of the entire structure to both fix the fiber position and provide a dielectric material so that high electric fields can later be applied across the D-shaped optical fiber.

As shown in FIG. 1C, the first insulation layer 14 and the D-shaped optical fiber 10 are polished to provide a planar surface, then a second electrode 15 is formed on the optical fiber, and then a second insulation layer 16 and metal layer 17 are deposited thereon.

As shown above, in the conventional method of fabricating periodically poled optical fibers, an optical fiber should go through the complex procedures of being processed into one with its cross-section in D-shape, fixed on the substrate, deposited over with a photoresist and removed of, then masked, and then deposited with an electrode material. So, the conventional method has a shortcoming of the complicacy of depositing the microelectrode pattern on a section of an optical fiber. Moreover, an electrode cannot be used again once used in forming polarization of an optical fiber.

Figure 2:
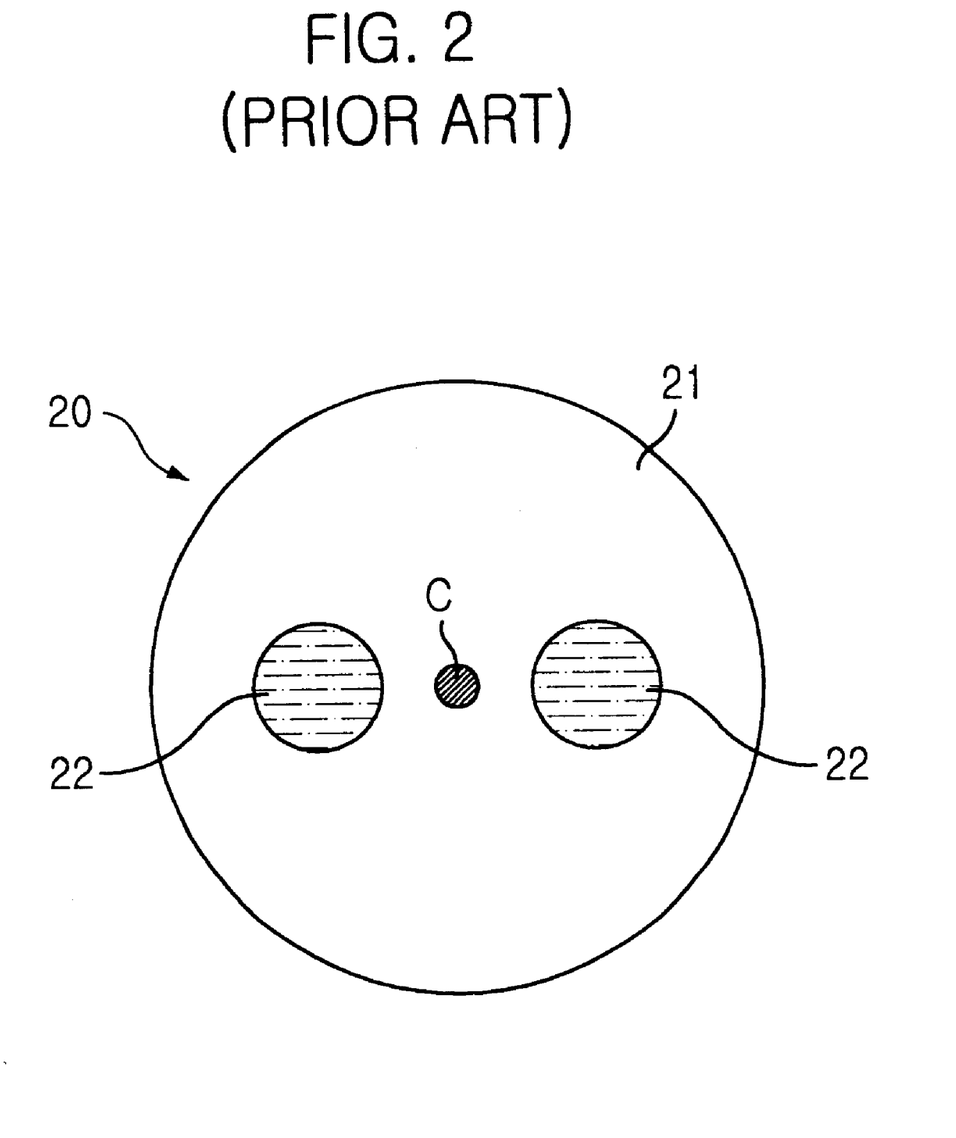
FIG. 2 shows a cross-sectional view of the structure of a conventional optical fiber provided with holes for inserting electrodes.

Meanwhile, as shown in FIG. 2, there are another method of inserting electrodes into two holes 22 around the core C of the optical fiber 20 from the opposite direction to each other, giving it voltage at a steady high temperature, sometimes irradiating a laser of ultraviolet wavelength, then cooling it down slowly after maintaining it for a predetermined period, thereby fixing the poling condition induced to the core of the optical fiber. These methods have a shortcoming that a domain poled periodically cannot be formed while it is possible to pole in the same direction over the entire optical fiber where a voltage is given to through electrodes. That is, the conventional fabrication method of periodically poled D-shaped optical fiber makes adjacent domains remain unpoled. Moreover, it is very hard to induce the already poled domains and the adjacent domains poled in the opposite direction to each other.

SUMMARY OF THE INVENTION

It is, therefore, an object of the present invention to provide an electrode for fabricating periodically poled optical fibers, which make the fabrication process relatively simple and inexpensive.

In accordance with an embodiment of the present invention, there is provided a method for fabricating poled optical fibers, which can form consecutive and further periodically inverting poling domain, thus increasing the second-order nonlinerity of optical fibers.

In accordance with an aspect of the present invention, there is provided an electrode for fabricating periodically poled optical fibers, which comprises a plurality of grooves on one or more surfaces.

In accordance with an aspect of the present invention, there is provided an electrode for fabricating periodically poled optical fibers, provided with a plurality of opening holes formed at a regular period.

In accordance with an aspect of the present invention, there is provided a method for fabricating periodically poled optical fibers using a first electrode made in accordance with anyone of claims 1 to 4, the method comprising the steps of: a) forming an optical fiber, which includes a lower clad layer, a core and an upper clad layer, provided with electrode arrangement space in the respective lower and the upper clad layers; b) placing the first electrode in one of the lower and upper clad layers and then placing a second electrode in the other clad layer; c) forming a plurality of a first poling domain by giving voltage to each the first and the second electrodes; d) re-arranging the first electrode and the second electrode so that domain not poled during the step c) could be poled; and e) forming a second poling space between each of the first poling spaces by giving voltage to the first and the second electrodes.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Other objects and aspects of the invention will become apparent from the following description of the embodiments with reference to the accompanying drawings, which is set forth hereinafter.

The present invention relates to the fabrication of a periodically poled optical fiber by using one or more electrodes provided with a plurality of grooves or a number of through-holes for a period satisfying the quasi phase matching condition between the light waves in use, in order to fabricate periodically poled optical fibers for enlarging the effect of three wave mixing according to the second-order nonlinear optical phenomenon. And, for the property of periodical poling using the electrodes mentioned above, the optical fiber has one or more holes around its core in its length direction, or has one or more grooves on its surface for a periodically poled optical fiber, capable of placing the electrodes and the core close to each other.

Therefore, the periodically poled optical fiber in accordance with the present invention does not require the procedure of forming microelectrode pattern through the light-exposure procedure. That is, unlike the conventional technique of forming electrode pattern on an optical fiber, the present invention forms a plurality of grooves at a regular interval on an electrode through mechanical or chemical process and then applies a voltage thereto.

By using the electrode described above, the present invention forms domains poled periodically in one direction and induces many other domains not poled yet to pole in opposite direction to existing domains, thus forming domains poled periodically in two directions opposite to each other. This way, the property of the second-order nonlinear optical fibers and the efficiency of the quasi phase matching can be improved.

The periodically poled optical fibers of the present invention can be used for a wavelength converter and the generation of phase-conjugated wave for dispersion compensation.

The optical fiber of the present invention will be described in detail hereinafter.

The value of a nonlinear optical coefficient induced to a core of an optical fiber is exponentially in inverse proportion to a distance between the core and an electrode. For instance, if a distance between a core and an electrode decreases a half, the nonlinear electrooptic coefficient increases more than ten-fold. But, it should be avoided to place a core and an electrode too closely because when they are too close to each other, the loss of light propagating through the core of the periodically poled optical fiber gets bigger. With the fact in mind, it's desirable to make grooves or through-holes around the core closely as long as the light transmission loss doesn't decrease.

FIGS. 3A to 3G show cross-sections of various electrodes in accordance with an embodiment of the present invention. It is possible that a cross-sectional shape can be modified into a various type such as a round, an oval or a square.

Figure 3:
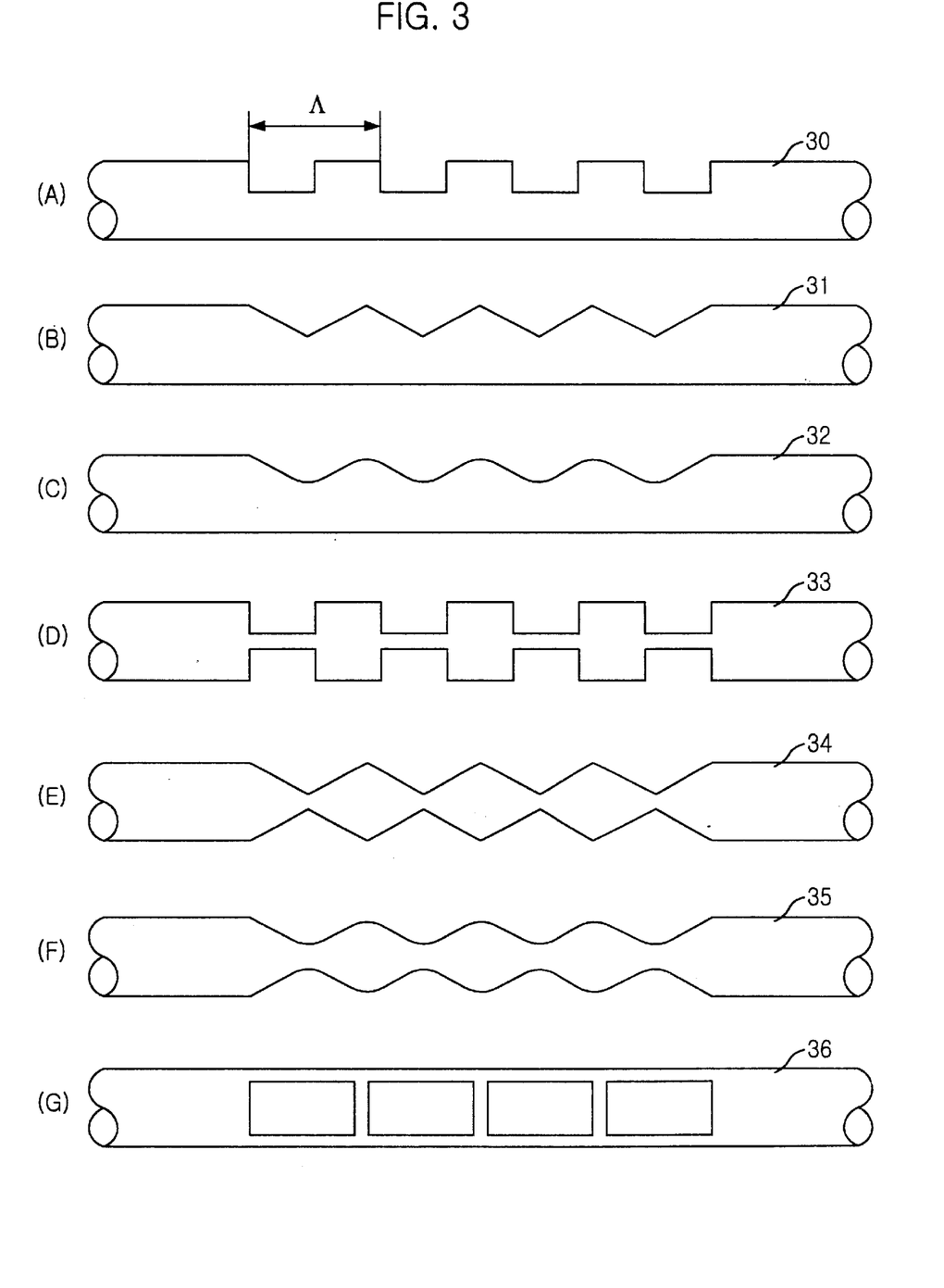
FIG. 3 is a schematic showing various electrodes in accordance with a first embodiment of the present invention.

Being processed mechanically or chemically, the electrodes are formed with grooves regularly in a predetermined shape. The minimum period ($\Lambda$) of the grooves is determined considering a wave you want and the effective refractive index of the optical fiver at that wave. Integral multiples of the minimum period determined as above is also fine.

$$\frac{n_p \omega_p}{c} - \frac{2\pi m}{\Lambda} = \frac{n_s \omega_s}{c} + \frac{n_i \omega_i}{c} \qquad \text{[Equation 1]}$$

wherein, p, s, i and c represent a pump light, a signal light, an idler light and the velocity of light in a vacuum, respectively. Meanwhile, n represents the effective refractive index of a mode proceeded at an angular frequency ($\omega$) and $\Lambda$ is a period of domain with the same poling direction, while m stands for the order of nonlinear lattice required for quasi phase matching, which is an integer. From Equation 1, the period of poling formed on optical fibers can be determined. From Equation 1, we can also notice that the period can be integral multiples of the minimum period determined when m is 1. The shape of grooves formed on optical fibers may be rectangle, triangle or a shape of a certain function. Here, the length ($\Lambda$) from valley to top should be 2 $\mu$m and up. In an embodiment of the present invention, the length ($\Lambda$) from valley to top is to be more than 5 $\mu$m. As shown in FIGS. 3A to 3C, grooves may be formed on one side of an electrode close to the core of an optical fiber, or as shown in FIGS. 3D to 3H, they may be formed all around the core. Also, as shown in FIG. 3G opening holes may be formed at regular intervals in the middle of the electrode.

Figure 4A:
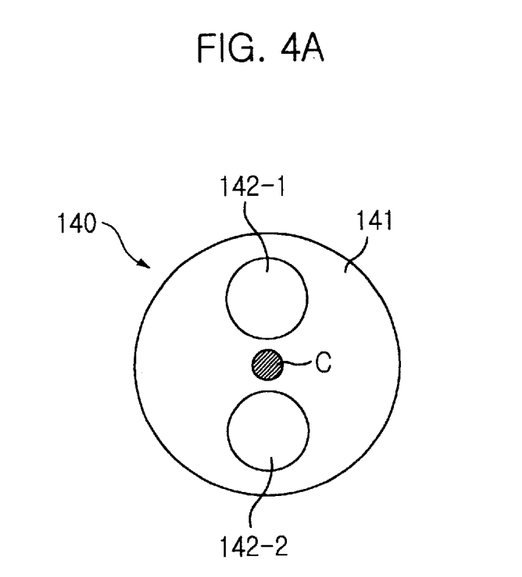
FIG. 4 shows cross-sectional views of various optical fibers joined with electrodes in accordance with a second embodiment of the present invention.
Figure 4B:
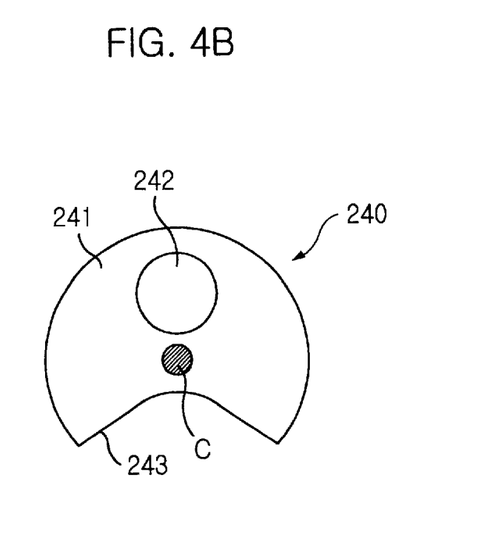
Figure 4C:
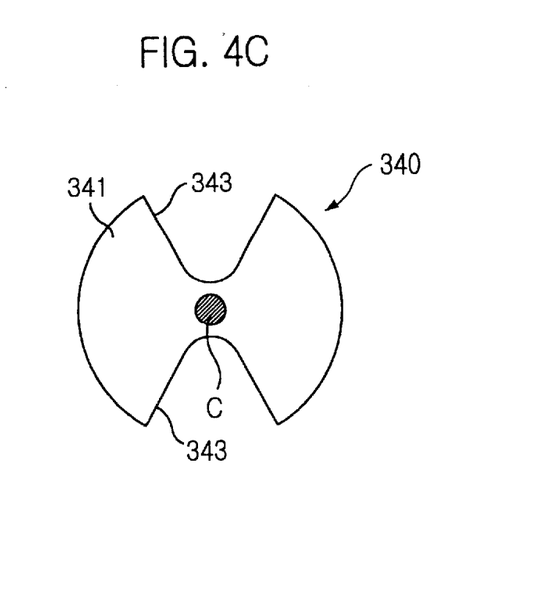

FIG. 4 illustrates a cross-sectional view of various optical fibers, which diverse forms of electrodes mentioned above are inserted or attached thereto. They are showing optical fibers with one or more holes in the clad layer in the length direction of the optical fiber, or ones with one or more grooves on its surface. To put it concretely, FIG. 4A shows an optical fiber 140 with two holes 142-1, 142-2 for electrodes around the core C; FIG. 4B shows an optical fiber 240 provided with a hole 242 for an electrode around the core C in the clad layer 241 and with a groove 243 formed in the opposite side of the hole 242 with respect to the core C; FIG. 4C shows an optical fiber 340 provided with two grooves 343 formed in a clad layer 241 opposite to each other with respect to the core C. In case of molding grooves on the surface, it's preferable to use relatively thick electrode. The shape of optical fibers is not limited to those seen in FIG. 4 as long as the electrode is processed to have contact with the core of an optical fiber effectively.

The optical fibers with the cross-sections shown in FIGS. 4A–4C are relatively easy to process, because you can process the optical fiber material mechanically and draw the processed material into the optical fiber. The drawn optical fiber maintains the shape of the material as it was.

Figure 5:
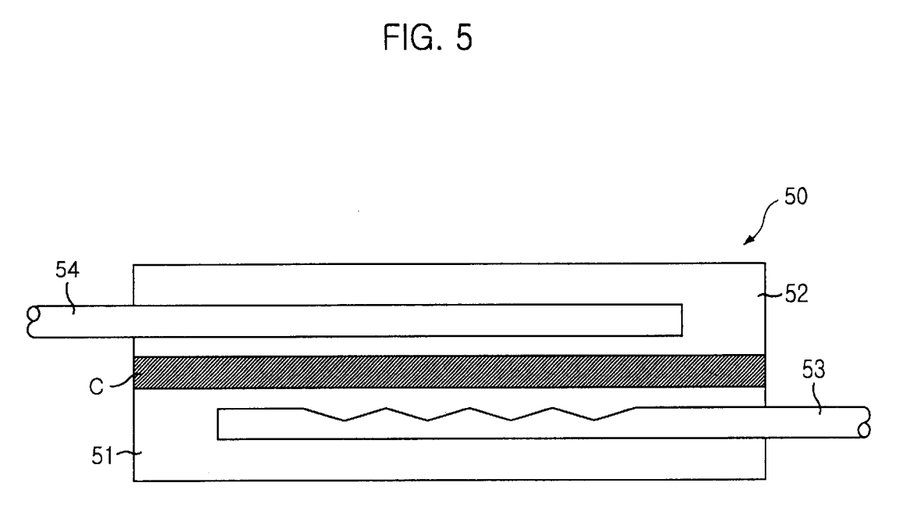
FIG. 5 shows the combination of electrodes and an optical fiber in accordance with a third embodiment of the present invention.

FIG. 5 is a cross-section of electrodes and an optical fiber joined together. In this figure, the optical fiber 50, comprising a lower clad layer 51, a core C and an upper clad layer 52, has two electrodes: one with a plurality of grooves formed regularly on the lower clad layer 51, and the other electrode 54 without any groove in the upper clad layer 52.

The electrode 53 should be placed with its grooves toward the core of the optical fiber. That is, the distance between the core C and grooves are to be as short as possible. And it's desirable to insert two electrodes 53, 54 from the opposite direction to each other. The electrode 53 with grooves thereon is desirable to be used as a negative pole. The electrode without any groove 54 may also be replaced with one with regularly formed grooves, but in that case, the electrodes, each used as a positive and a negative, should be arranged with their tops and valleys different as much as half a period to each other. That is, the distance between the two electrodes should differ when seen from the direction of radius. Here, the bigger the distance difference is, the more preferable it is. To fabricate a periodically poled optical fiber with polarizing direction different from each other with the electrodes arranged as mentioned above, the electrodes should be moved aside so as to make the distance between two electrodes shortest in the domain unpoled during the first poling and given voltage, after conducting the first poling.

As aforementioned, the procedure of inducing periodic poling when electrodes and an optical fiber are joined is the same as the conventional procedure of inducing poling. That is to give an optical fiber voltage in a vacuum maintained at a predetermined temperature or under a certain gas atmosphere and to cool it down slowly with voltage still endowed. An ultraviolet laser may be irradiated in the procedure inducing poling.

Figure 6A:
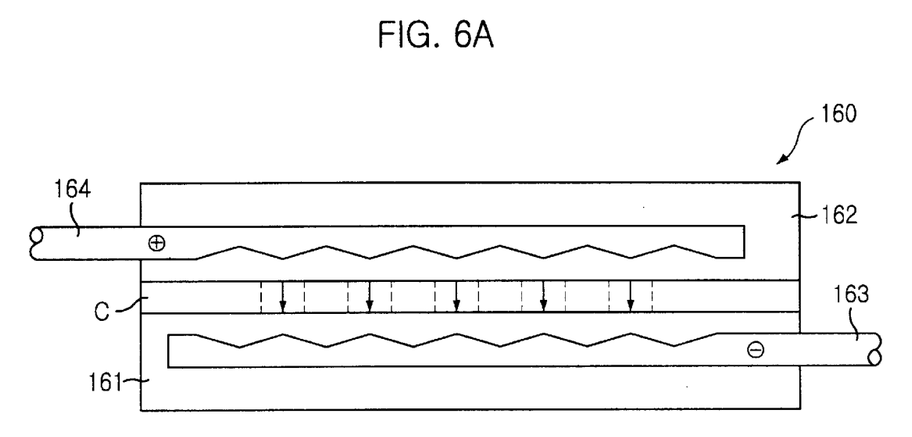
FIGS. 6A and 6B illustrate cross-sectional views of the process fabricating a periodically poled optical fiber poled in opposite direction to the adjacent domains in accordance with a fourth embodiment of the present invention.

FIGS. 6A and 6B illustrate cross-sectional views of an optical fiber periodically poled in opposite direction to the adjacent domains. FIG. 6A shows an optical fiber 60 provided with a lower clad layer 161, a core C, an upper clad layer 162, insertion space for electrodes both inside upper and lower clad layers 162, 161 and a first electrode 163 and the second electrode 164 with a plurality of grooves, each electrode formed for the same period. Here, valleys of the first electrode 163 and the second electrode 164 should be placed face to face. That is, tops of the first electrode 163 should look at the tops of the second electrode 164. In case of using electrodes with opening holes as in FIG. 3G the opening holes of each electrode should face to each other. Subsequently, with a positive and a negative power sources each connected to the first electrode 163 and the second electrode respectively a first poling is arranged to occur.

Figure 6B:
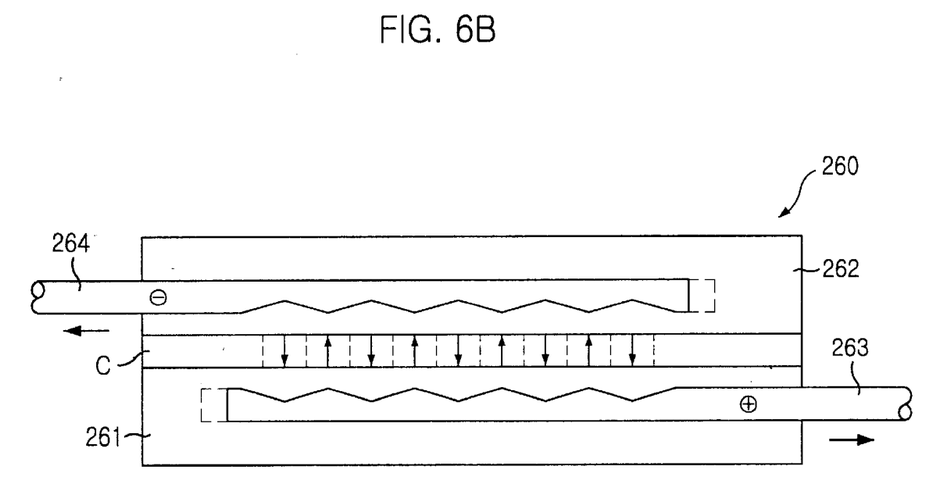

Then, as shown in FIG. 6B, in order to pole the domain yet to be poled during the first poling in opposite direction, the two electrodes should be moved in parallel as much as half a period so that the two electrodes are arranged closest to each other in the domain not poled during the first poling, and then carry out a second poling. The first electrode 263 and the second electrode 264 are switched and inserted again. That is, the second electrode 264 is inserted in the lower clad layer 261, while the first electrode 263 is placed in the upper clad layer 262. Here, valleys of the first and the second electrodes 263, 264 should not be positioned face to face.

Subsequently, with a positive and a negative power sources, each connected to the first electrode 263 and the second electrode 264 respectively, a poling occurs in the neighboring domain, which was not poled during the first poling procedure.

Figure 7:
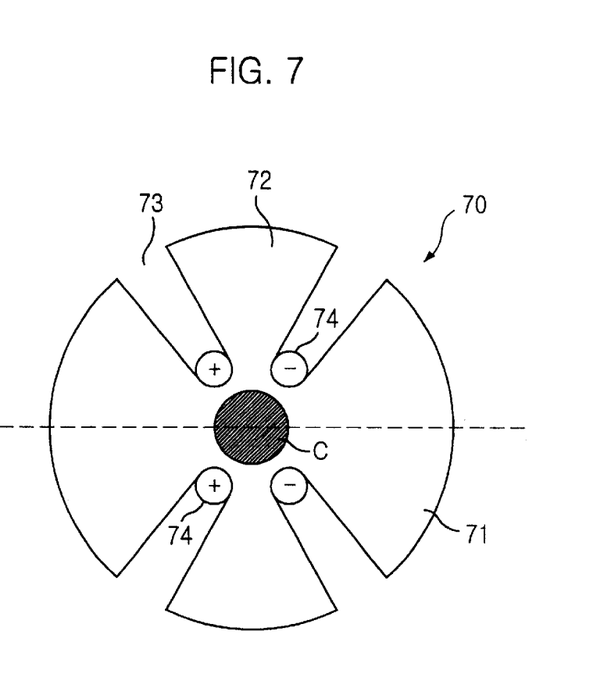
FIG. 7 depicts cross-sectional view of a periodically poled optical fiber poled in opposite direction to the adjacent domains in accordance with a fifth embodiment of the present invention.

FIG. 7 depicts cross-sectional view of the arrangement of an optical fiber 70 and electrodes for fabricating a periodically poled optical fiber in accordance with the present invention. As briefly shown in the figure, the optical fiber 70 has a total of four grooves 73, each two of which are formed in the lower clad layer 71 and the upper clad layer 72 respectively, and an electrode 74 is inserted to each groove and given power source, thus forming a periodically poled optical fiber with a poled domain in opposite direction to the neighboring domain. Here, one important point to have in mind is that the electrodes should be arranged in opposite polarizing direction to the adjacent domain.

As described above, periodically poled optical fibers in accordance with the present invention could be used for dispersion compensation or along with a laser.

Figure 8:
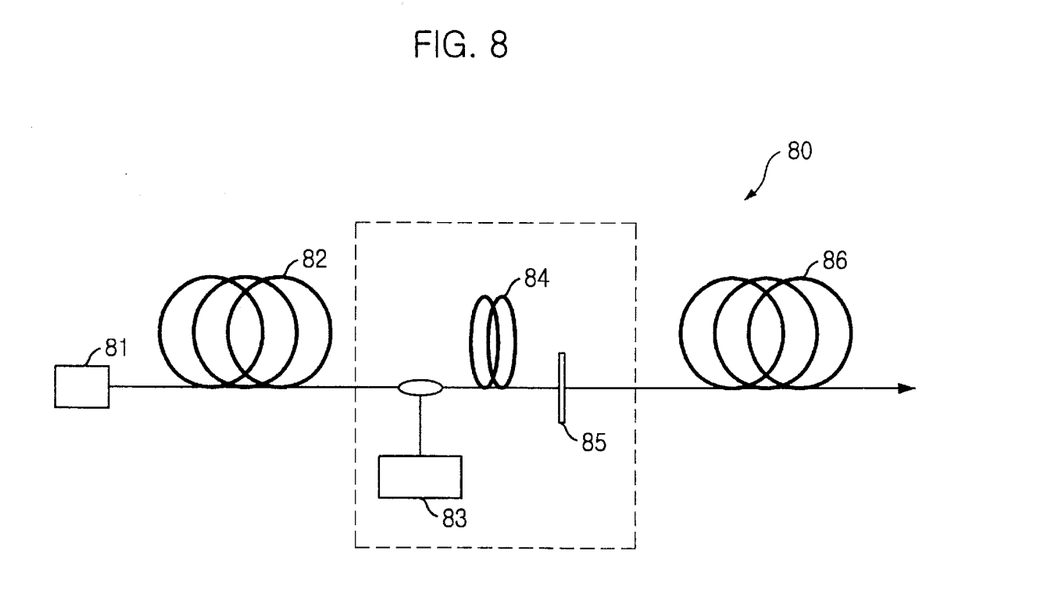
FIG. 8 is a schematic view of an optical system incorporated therein a periodically poled optical fiber in accordance with the present invention.

FIG. 8 is a schematic view of an optical system 80 incorporated therein a periodically poled optical fiber in accordance with the present invention, comprising a first light source 81 for generating a signal light, a first single mode optical fiber 82 for transmitting the signal light from the first light source 81, a second light source 83 for producing a pumping light, a periodically poled optical fiber 84 for receiving the signal light transmitted through the single mode optical fiber 82 and the pump light from the second light source 83, an optical filter 85 for filtrating the combined light passed through the periodically poled optical fiber 84 and a second single mode optical fiber 86 for guiding the filtrated light. As shown in FIG. 8, with inserting the periodically poled optical fiber 84 in the middle of the optical path between the first and the second single mode optical fibers 82, 86, and applying a pumping light whose wavelength is half of the signal light, a phase-shifted light is newly generated at a neighboring frequency of the signal light caused by a frequency generation effect due to difference between the pump light and the signal light, thereby compensating the dispersion generated in the optical path of the optical system 80. Also, this can be employed when the pump light forms a light whose frequency is half as long by a second harmonic generation so the light whose phase is inverted by a frequency generation difference between the new light and the signal light is used.

The present invention pole each optical fiber, which is employing the second nonlinear optical phenomenon with re-usable electrodes, without forming electrodes on the optical fiber for fabricating a periodically poled optical fiber, and thereby cutting down the cost.

While the present invention has been described with respect to certain preferred embodiments, it will be apparent to those skilled in the art that various changes and modifications may be made without departing from the scope of the invention as defined in the following claims.

What is claimed is:

1. An electrode wire for periodically poling an optical fiber, comprising:

the electrode wire in said fiber; and a plurality of grooves formed on the electrode wire perpendicular to a length direction of the electrode wire in a predetermined interval for satisfying the quasi phase matching condition of a nonlinear optical interaction.

2. The electrode of claim 1, wherein the grooves are formed at the same period on both sides.

3. The electrode of claim 1, wherein a height from top to valley is more than 2 $\mu$m.

4. An electrode wire for periodically poling an optical fiber, comprising:

the electrode wire in said fiber; and a plurality of opening holes formed on the electrode wire perpendicular to a length direction of the electrode wire in a predetermined interval for satisfying the quasi phase matching condition of a nonlinear optical interaction.

5. A method for fabricating an optical fiber including a first electrode, the method comprising the steps of:

a) forming an optical fiber, which includes a lower clad layer, a core and an upper clad layer, provided with electrode arrangement space in the respective lower and the upper clad layers;

b) placing the first electrode in one of the lower and upper clad layers and then placing a second electrode in the other clad layer;

c) forming a plurality of a first poled domain by giving voltage to each the first and the second electrodes;

d) re-arranging the first electrode and the second electrode so that domain not poled during the step c) could be poled; and e) forming a second poling space between each of the first poling spaces by giving voltage to the first and the second electrodes.

6. The method of claim 5, wherein the direction of the second poling domain is in opposite to that of the first poling domain.

7. The method of claim 6, wherein the second electrode has grooves whose period is the same as that of the first electrode.

8. The method of claim 7, wherein each of the first and the second electrodes moves half a period in parallel in the step d).

9. The method of claim 8, wherein the first electrode and the second electrode are arranged with their tops face to face each other in each of the step b) and the step d).

10. The method of claim 8, wherein the first electrode is given a negative voltage and the second electrode given a positive voltage in the step b); and the first electrode is given a positive voltage and the second electrode given a negative voltage in the step d).

11. The method of claim 10, wherein the optical fiber is provided with insertion holes for the first and the second electrode in at least one of the upper and lower clad layers.

12. The method of claim 10, wherein the optical fiber is provided with in at least one of the upper and lower clad layers. Grooves for the first and the second electrodes in at least one of the upper and lower clad layers.

* * * * *